United States Patent [19]

Ferri et al.

[11] 3,870,650

[45] Mar. 11, 1975

[54] EUROPIUM-ACTIVATED RARE EARTH OXIDE PHOSPHORS

[75] Inventors: John L. Ferri, Towanda; James E. Mathers, Ulster, both of Pa.

[73] Assignee: GTE Sylvania Incorporated, Stamford, Conn.

[22] Filed: Sept. 13, 1973

[21] Appl. No.: 397,013

Related U.S. Application Data

[63] Continuation of Ser. No. 155,330, June 21, 1971, abandoned, which is a continuation-in-part of Ser. No. 812,825, April 2, 1969, abandoned.

[52] U.S. Cl. ......................................... 252/301.4 R
[51] Int. Cl. ............................................... C09k 1/10
[58] Field of Search ............................. 252/301.4 R

[56] References Cited
UNITED STATES PATENTS

| | | | |
|---|---|---|---|
| 3,322,682 | 5/1967 | Thompson | 252/301.4 R |
| 3,368,980 | 2/1968 | Avella et al. | 252/301.4 R |
| 3,420,861 | 1/1969 | Ropp et al. | 252/301.4 R X |
| 3,449,259 | 6/1969 | Ropp | 252/301.4 R |
| 3,458,450 | 7/1969 | Kobayashi et al. | 252/301.4 R |
| 3,458,451 | 7/1969 | Kobayashi et al. | 252/301.4 R |
| 3,484,381 | 12/1969 | Yale et al. | 252/301.4 R |
| 3,562,175 | 2/1971 | Hickok | 252/301.4 R |
| 3,577,351 | 5/1971 | Dodds | 252/301.4 R |

*Primary Examiner*—Jack Cooper
*Attorney, Agent, or Firm*—Norman J. O'Malley; Donald R. Castle; William H. McNeill

[57] ABSTRACT

A particulate cathodoluminescent phosphor is disclosed that has the empirical formula, $(Y_{1-x}Gd_x)_2O_3$:Eu, wherein $x$ is from 0 to 1, the molar ratio of europium to yttrium and gadolinium being from about 0.1:100 to about 20:100, having at least about 70 percent of parallelepipedonal particles and an overall average size of from about 1 to about 20 microns.

7 Claims, 6 Drawing Figures

EUROPIUM-ACTIVATED RARE EARTH OXIDE PHOSPHORS

CROSS-REFERENCE TO RELATED APPLICATIONS

This application is a continuation application of Ser. No. 155,330 filed June 21, 1971, now abandoned which is assigned to the assignee of the present invention. Assignment recorded June 21, 1971, Reel 2835, Frame 067, which is a continuation-in-part of Ser. No. 812,825, filed Apr. 2, 1969, and now abandoned.

The novel rare earth oxide phosphors can be produced from some of the rare earth oxides produced by some of the limited aspects of the method disclosed in our co-pending patent application Ser. No. 812,913, filed Apr. 2, 1969, and now U.S. Pat. No. 3,635,658, for producing large particle size rare earth oxides containing a rare earth source. That method has been found to have general application for increasing and controlling the particle size of rare earth oxides. In the present application, the new phosphors have a discrete and unique particle shape. Additionally, the unique particle shape of the phosphors of the present invention enables the subject phosphors to have a broader utility than many of those disclosed in the foregoing copending application.

Additionally, the unique phosphors of the present invention can be combined with other phosphors and used in unobvious manner to yield an unexpected and novel color television viewing panel. This, however, is the subject matter of a separate patent application, Ser. No. 822,794, filed Apr. 2, 1969, now abandoned and disclosed in a continuation-in-part application, Ser. No. 7,449, filed Feb. 2, 1970 and assigned to the same assignee as this application.

BACKGROUND OF THE INVENTION

This invention relates to europium-activated rare earth oxide phosphors. More particularly, it relates to europium-activated rare earth oxide phosphors having a unique physical form that imparts unexpected properties to the phosphors.

When exposed to cathode ray excitation the europium-activated rare earth oxide phosphors selected from the group consisting of gadolinium oxide, yttrium oxide and mixed gadolinium-yttrium oxide phosphors emit a bright red. The emission is at least 1½ times as bright as the red-emitting phosphors currently used in color television. As is well known, a particular phosphor can emit a given level of brightness when subjected to cathode ray excitation in the laboratory, however, due to the processing steps that are required to produce a screen utilizing the phosphor, the brightness of the emission from the phosphor after it is deposited on the screen can be considerably lower than the brightness before deposition. Loss of brightness of the emission has been experienced with the foregoing rare earth oxide phosphors as heretofore known. Several factors are believed to cause the loss in brightness when the phosphors are deposited on the screen. One of the contributing factors is believed to be the finely divided irregular physical form of the particles of rare earth oxide phosphors that have been heretofore known. An additional factor that has deterred the commercial acceptance of the rare earth oxide phosphors previously known, is their relatively poor handling characteristics. The phosphors tend to form agglomerates of the irregular-shaped particles that tend to break apart upon repeated handling. Thus, the particle size distribution tends to change as the phosphor is handled.

A major contributing factor to the general non-acceptance of the rare earth oxide phosphors by the color television industry is due to the fact that the rare earth oxide phosphors, as currently produced have to be deposited using the "slurry technique" in which the phosphors are mixed with a photosensitive material and deposited upon the panel or screen in the form of an aqueous slurry. It is believed that a chemical reaction occurs between the rare earth oxide and the chemical sensitizer that is used in the process. The reaction product is not a phosphor, hence some loss in brightness. A partial protection against the undesired reaction can be achieved by the use of protective coatings on the phosphor. As previously mentioned however the irregular-shaped particles tend to form agglomerates that break apart upon repeated handling. A protective coating when applied can coat the agglomerates then as it breaks apart some uncoated surfaces will be present. Additionally, the irregular shape of the particles makes effective coating extremely difficult.

An additional method of applying phosphors to viewing panels or screens is well known and is described in U.S. Pat. No. 3,025,161. Because of the shortened contact with chemical sensitizer the adverse reaction between the phosphors and the sensitizer is reduced. However, some cross-contamination between the red, green and blue emitting phosphors occurs because of the small particle size of the rare earth oxide phosphor heretofore known.

It is believed, therefore, that an europium-activated rare earth oxide phosphor that minimizes, reduces, obviates or overcomes many of the problems heretofore associated with the rare earth oxide phosphors thus enabling the phosphor to be applied to the screen without an appreciable loss in brightness would be an advancement in the art.

SUMMARY OF THE INVENTION

In accordance with this invention there is provided a particulate phosphor having the empirical formula $(Y_{1-x}Gd_x)_2 O_3$:Eu, wherein $x$ is from 0 to 1, the molar ratio of europium to yttrium and gadolinium being from about 0.1:100 to about 20:100, having at least about 70 percent of parallelepipedonal particles with an overall average particle size of from about 1 to about 20 microns.

Figure 1:
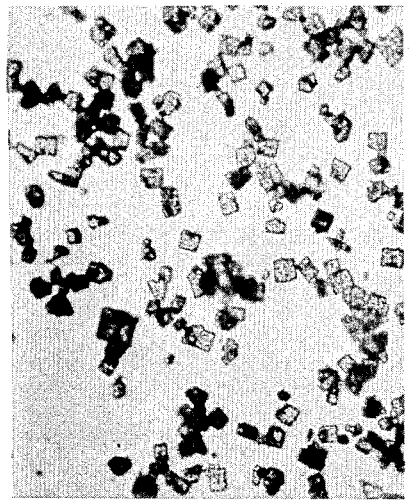
FIG. 1 is a photomicrograph of europium-activated yttrium oxide phosphor of the present invention.
Figure 3:
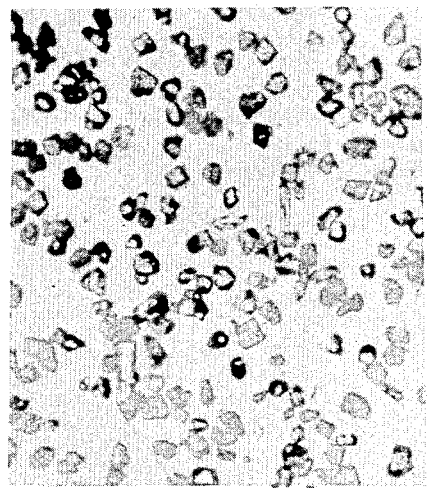
FIG. 3 is a photomicrograph of europium-activated gadolinium-yttrium oxide phosphor of the present invention.
Figure 5:
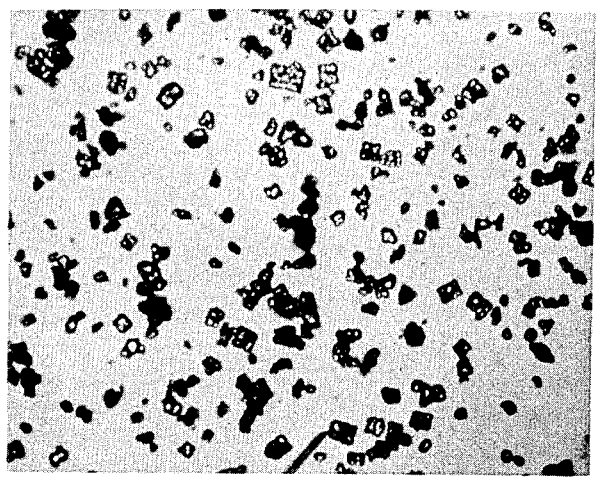
FIG. 5 is a photomicrograph of europium-activated gadolinium oxide phosphor of the present invention.

With particular reference to FIGS. 1, 3 and 5 the photomicrographs show the phosphors have at least 70 percent of parallelepipedonal particles. The particles in this instance are geometrically shaped and in the case of yttrium oxide approach cubes having their six faces almost equal.

Figure 2:
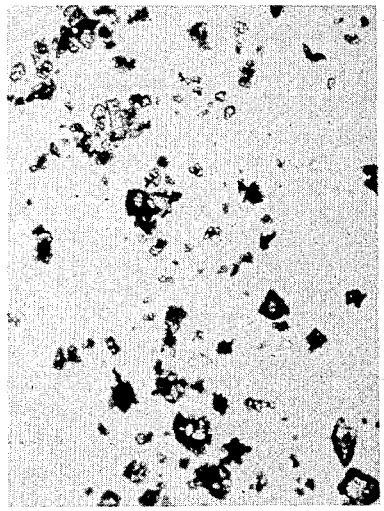
FIG. 2 is a photomicrograph of prior art europium-activated yttrium oxide phosphor.
Figure 4:
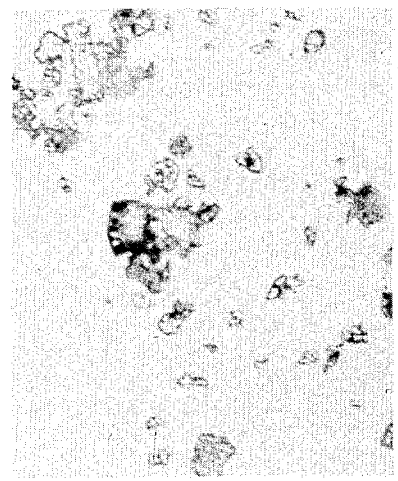
FIG. 4 is a photomicrograph of europium-activated gadolinium-yttrium oxide phosphor of the prior art.
Figure 6:
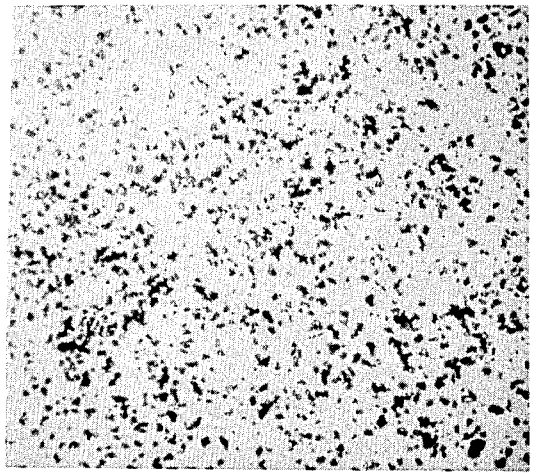
FIG. 6 is a photomicrograph of europium-activated gadolinium oxide phosphor of the prior art.

With particular reference to FIGS. 2, 4 and 6, the irregular shaped, agglomerated, finely divided particles of the prior art oxide phosphors are shown.

DESCRIPTION OF THE PREFERRED EMBODIMENTS

For a better understanding of the present invention, together with other and further objects, advantages and capabilities thereof, reference is made to the following disclosure and appended claims in connection with the accompanying drawings.

The europium-activated oxide phosphors of the present invention have at least about 70 percent to about 100 percent of parallelepipedonal particles and overall average particle size from about 1 to about 20 microns. These phosphors can be used in conjunction with the prior art europium-activated rare earth oxide phosphors in a uniform blend, if desired, up to about a 1:1 weight ratio. As long as the resulting phosphor composition contains at least about 30 percent of the particles as parallelepipedonal particles and has an average particle size of from about 1 to about 20 microns, the advantages of this invention are obtained. Photomicrographs of the phosphor compositions and its luminescent characteristics enable one skilled in the art to readily discern the contributions of this invention. The well-defined geometric shape of the particles enables protective coatings to be applied in a more even manner. The particles during the coating operations are free flowing, therefore, in general all faces of the particles receive the coating and further handling does not appreciably reduce effectiveness of the coatings. As will be discussed in more detail hereinafter, a preferred embodiment is a phosphor containing at least 70 percent of the parallelepipedonal particles and having an overall average particle size of from about 3 to about 10 microns, thus enabling their effective use in the dry deposition technique similar to that disclosed in U.S. Pat. No. 3,025,161.

It is to be noted that the particle shape is described herein and not the crystal structure. Crystal structure of the phosphor can have the same or different geometric description. The definitions herein apply to the external surfaces of the particles and have no particular relationship to the crystals that comprise the complete particle.

As is shown in the photomicrographs, the yttrium oxide phosphor particles of the present invention are essentially cubical while some of the mixed crystal gadolinium-yttrium oxide particles are shown to have a parallelepiped structure in which the faces are more of a rectangular shape than squares as in the yttrium oxide particles.

The novel phosphors of this invention can be prepared by forming an appropriate rare earth oxalate generally by precipitating the oxalate from an acidic aqueous solution containing the appropriate rare earth source, separating the rare earth oxalate as a solid, washing the solid rare earth oxalate with an aqueous solution containing at least about 5 percent by weight of oxalic acid, and thereafter heat treating to convert the rare earth oxalate to a rare earth oxide phosphor. Apparently the particle size of the phosphor is controlled by the amount of residual free oxalic acid that is retained on the particles during washing, since solutions containing less than about 5 percent by weight of oxalic acid do not appreciably effect the size or the shape of the particles. A relatively concentrated aqueous solution of oxalic acid is generally used to insure that at least some oxalic acid is deposited on essentially each rare earth oxalate particle. The amount of residual oxalic acid that is deposited upon the oxalate before firing can be controlled by subsequently washing with water although the beforementioned minimum concentration of oxalic acid is necessary. In general, larger quantities of oxalic acid will yield the maximum particle size growth. Use of subsequent water washes are preferred to control the growth of the particles. The larger the amount of oxalic acid residue left in the oxalate particles before firing, the larger the oxide phosphor particles will be. If the phosphor is to be used and deposited via the "slurry" technique generally an average particle size in the 1 to 6 micron range is desired. As previously mentioned, if the phosphor is to be deposited via a "dry" technique as given in U.S. Pat. No. 3,025,161 a particle size of from about 3 to about 10 microns is preferred.

To more fully illustrate some of the aspects of this invention, the following detailed examples are presented. All parts, proportions and percentages are by weight unless otherwise indicated.

EXAMPLE I

Europium-activated yttrium oxide having the composition $Y_2O_3$:Eu, the molar ratio of europium to yttrium being about 4.7:100 is prepared by dissolving about 215.6 parts of $Y_2O_3$ (99.999 percent purity) and about 15.8364 parts of $Eu_2O_3$ (99.999 percent purity) in 928 parts of a 1:1 nitric acid solution. The rare earth nitrate solution is then filtered. A hot 20 percent oxalic acid solution is slowly added to the nitrate filtrate until no further oxalate precipitation is observed. The rare earth oxalates are then filtered and washed with 1000 parts of a 20 percent oxalic acid solution. The washed oxalate material is then dried at about 110°C. The dried oxalates are then fired in a furnace, at about 1260°C for 6 hours. The cooled fired material is then sieved through a 400 mesh screen to remove the oversize fraction. The resultant particles average about 8 microns in diameter as measured by Fisher Subsieve Sizer. photomicrographs of a sample of the material at 1,000 x is shown in FIG. 1 and contains at least about 80 percent of parallelepipedonal particles.

For purpose of comparison, the cathodoluminescent intensity of the phosphor made by this method is compared with that of the prior art prepared by firing water-washed oxalates of yttrium and europium. Phosphors prepared using the $H_2O$ washed material have a large population of irregular shaped fines and an average particle diameter of about 2.5 microns when subjected to standard screening. Photomicrographs of samples of this material before screening is shown in FIG. 2, and contain only minor amounts, if any, of particles having a discrete form.

Cathodoluminescent intensity for the phosphor made by the oxalic acid wash method is equal to that of a control material prepared without the oxalic acid washing of the mixed oxalates.

EXAMPLE II

Using essentially the same procedure as in Example I except that the precipitated oxalates are given a 5 percent oxalic acid solution wash, it is found that the resultant phosphor particles have an average diameter of about 4.5 microns as measured by Fisher Sub Sieve Size and about 7.5 microns by the Coulter Counter technique. Cathodoluminescent properties are similar to those obtained for the phosphor of Example I by the oxalic acid wash method. Photomicrographs show that the particles are similar to those prepared in Example I with at least 90 percent of parallelepipedonal particles.

Example III

Europium-activated yttrium-gadolinium oxide having the formula, $(Y_{.16}Gd_{.84})_2O_3$:Eu with a ratio of europium to yttrium and gadolinium of about 4.7:100 essentially as described in Example I, except that an oxalic acid wash solution containing 30 percent oxalic acid is used and a firing temperature of 1232°C is employed. The resulting phosphor has an average particle size of about 5 to 6 microns by F.S.S.S. A phosphor prepared in essentially the same manner except that no oxalic acid is used has irregular-shaped particles averaging below about 2 microns. Photomicrographs of samples of both materials are shown in FIGS. 3 and 4.

EXAMPLE IV

Example III is repeated except that the co-precipitated yttrium-gadolinium-europium oxalates are washed with a 10 percent oxalic acid solution. Cathodoluminescent properties are similar to those obtained for the phosphor of Example III. The particle size of the phosphor is about 4 microns by F.S.S.S. and about 7.5 microns by the Coulter Counter. The particles are essentially parallelepipedonal and are similar to those shown in FIG. 3.

EXAMPLE V

Europium-activated gadolinium oxide having the composition $Gd_2O_3$ with a europium to gadolinium molar ratio of about 5:100 is prepared by a method similar to that of Example I, except that a 20 percent oxalic acid wash solution is employed and the firing temperature is about 1,175°C. The resultant parallelepipedonal phosphor particle size is about 3 microns by F.S.S.S. and about 7 microns by Coulter Counter. A control material prepared according to Example V, but with no oxalic acid washing step and a water wash instead is about 1.7 microns by F.S.S.S. and about 4 microns by Coulter Counter. The luminescent properties of the phosphor is equal to those of the control material. Photomicrographs of samples of these materials are shown in FIGS. 5 and 6.

EXAMPLE VI

Example V is repeated, except that a saturated solution of oxalic acid at 80°C. is used as a wash. The resultant phosphor particles are about 5–6 microns by F.S.S.S. and the luminescent properties are about the same as a control prepared with water washes.

EXAMPLE VII

An alternate method of preparing europium-activated yttrium and/or gadolinium oxide phosphors of predetermined particle size utilizes the oxalic acid flux as described in Examples I through VI; however, the residual nitrates and oxalic acid are controlled by water washes. Table I illustrates the effects of this technique on the resultant phosphors particle size and cathodoluminescent efficiency.

TABLE I

| Washes, No. | ($Gd_2O_3$:Eu Phosphor) Particle Size F.S.S.S. Microns | CRT Brightness vs. Control |
|---|---|---|
| 1 | 5.3 | 99 |
| 2 | 4.62 | 100 |
| 3 | 3.02 | 101 |
| 4 | 1.86 | 99 |
|   | ($Y_2O_3$:Eu Phosphor) |   |
| 1 | 13.2 | 100 |
| 2 | 6.02 | 98 |
| 3 | 3.51 | 100 |
| 4 | 2.65 | 99 |

While there have been shown and described what are at present considered the preferred embodiments of the invention, it will be obvious to those skilled in the art that various changes and modifications may be made therein without departing from the scope of the invention as defined by the appended claims.

What is claimed is:

1. A particulate cathodoluminescent phosphor having the empirical formula, $(Y_{1-x}Gd_x)_2O_3$:Eu, wherein $x$ is from 0 to 1, the molar ratio of europium to yttrium and gadolinium being from about 0.1:100 to about 20:100, having at least 70 percent of parallelepipedonal particles and an overall average size of from about 1 to about 20 microns.

2. A phosphor composition according to claim 1 wherein $x$ is 1.

3. A phosphor composition according to claim 1 wherein $x$ is from about 0.5 to about 0.95.

4. A phosphor composition according to claim 3 wherein said particle size is from about 3 to about 10 microns.

5. A phosphor composition according to claim 1 wherein $x$ is 0.

6. A phosphor composition according to claim 5 wherein said particles are essentially cubical.

7. A phosphor composition according to claim 6 wherein said particle size is from about 3 to about 10 microns.

* * * * *